United States Patent [19]
Jacobson et al.

[11] 3,798,590
[45] Mar. 19, 1974

[54] SIGNAL PROCESSING APPARATUS INCLUDING DOPPLER DISPERSION CORRECTION MEANS

[75] Inventors: Arthur J. Jacobson, Fort Wayne, Ind.; Gilbert J. Huey, San Diego, Calif.

[73] Assignee: The United States of America as represented by the Secretary of the Navy, Washington, D.C.

[22] Filed: Sept. 12, 1968

[21] Appl. No.: 761,010

[52] U.S. Cl. ............. 340/3 R, 340/3 FM, 340/3 D, 343/5 DP, 343/9, 343/100 CL
[51] Int. Cl. ............................................. G01s 9/68
[58] Field of Search ....... 340/3, 3 FM, 3 D; 343/14, 343/17.2, 17.2 PC, 100.7, 50 P, 8, 9

[56] References Cited
UNITED STATES PATENTS

| | | | |
|---|---|---|---|
| 2,834,956 | 5/1958 | Harris, Jr. | 343/14 |
| 3,130,404 | 4/1964 | Fried | 343/14 |
| 3,199,106 | 8/1965 | Karr | 343/17.2 |
| 3,355,579 | 11/1967 | Robertson | 343/100.7 |
| 3,404,400 | 10/1968 | Miller, Jr. | 340/3 X |

*Primary Examiner*—Richard A. Farley
*Attorney, Agent, or Firm*—Edgar J. Brower; Henry Hansen; B. Frederick Buchan, Jr.

[57] ABSTRACT

Apparatus for processing data signals such as sonar return signals of the frequency modulated type wherein adverse effects of Doppler dispersion are eliminated which apparatus includes a signal generator providing an inverse replica of that signal which is shifted upwardly in frequency and is transmitted as the sonar signal, a pair of digital time compression units for compressing respective ones of the down-shifted sonar return signal, i.e., a data signal, and the replica signal, a pair of step clock generators each enabling the memory bank contents of the associated time compression unit to be read out at respective various rates thereby varying in steps the time compression ratios of the units and bandpass correlation apparatus including a first balanced modulator for receiving and operating on the compressed output signals of the time compression unit. The output frequencies of the step clock generators vary in steps so that the compressed replica signal frequency is, in effect, translated upwardly by decreasing degrees for a range of predetermined positive relative target velocities and, thereafter, the compressed data signal frequency is translated upwardly by increasing degrees for a range of predetermined negative relative target velocities thereby enabling, in effect, correlation of the data signal with a suitable replica signal for each of a number of predetermined relative target velocities in a predetermined range. The filtered output signal from the first modulator and an output signal of a step oscillator whose output signal frequency varies in steps according to the predetermined relative target velocities are applied to a second modulator to compensate for Doppler-induced frequency shifts in the transmitted sonar signal. The filtered output signal of the second modulator is detected and integrated to provide points on the correlation functions in the range-Doppler plane.

17 Claims, 5 Drawing Figures

INVENTORS
ARTHUR J. JACOBSON
GILBERT J. HUEY
BY
ATTORNEYS

SIGNAL PROCESSING APPARATUS INCLUDING DOPPLER DISPERSION CORRECTION MEANS

BACKGROUND OF THE INVENTION

This invention relates generally to signal processing apparatus and, more particularly, to sonar return signal processing apparatus of the bandpass correlation type.

Detection of return sonar signals under conditions wherein a relatively low signal-to-noise ratio applies may be accomplished by correlating the return sonar signal with a replica thereof. Also, the effective range of sonar apparatus can be increased by utilizing known techniques of providing frequency modulated signals and effecting pulse compression. Using matched filters to detect sonar return signals from moving targets is greatly complicated by the effects of Doppler dispersion upon sonar signals of varying frequency because the portions of the signal having the greatest frequency experience the greatest Doppler shift. The ambiguity or uncertainty function $X(\tau, \phi)$ provides a convenient means of describing the effects of signal modulation in terms of range and Doppler resolution, of reverberation, of discrimination, and of range and Doppler ambiguities and may be defined by:

$$X(\tau, \phi) = \int_{-\infty}^{\infty} \mu(t)\mu^*(t+\tau)e^{-j2\pi\phi t}dt$$

$$= \int_{-\infty}^{\infty} U^*(f)U(f+\phi)e^{-j2\pi f\tau}df \quad (1)$$

wherein:

$\tau$ = time delay, $\phi$ = Doppler frequency shift, $\mu(t)$ = the signal as a function of time (waveform), $U(f)$ = the signal as a function of frequency (spectrum) and

* denotes the complex conjugate. Because equation 1 treats the Doppler frequency shift as being uniform throughout the modulation bandwidth W, its application can lead to erroneous conclusions particularly in sonar applications where the bandwidth-time products are not small in comparison to the Doppler factor $c/2v$ where $c$ is the velocity of propagation and $v$ is the relative target velocity. Doppler dispersion thereby distorts the frequency-time characteristic of the signal, degrades the degree of time resolution achievable by the processing apparatus and can made correlation most difficult. The provision of a plurality of signal generators, each generating a suitable replica of the anticipated return signal which has undergone the appropriate Doppler frequency shifts over its entire bandwidth attributable to a corresponding one of several predetermined relative target velocities undesirably increases the cost, size and complexity of the processing apparatus.

SUMMARY OF THE INVENTION

It is the general purpose of this invention to provide signal processing apparatus wherein the undesirable effects of Doppler dispersion are eliminated and wherein the return signal of a transmitted sonar or radar signal of the frequency modulated type may be processed in a manner to assure detection with a high degree of resolution. Briefly, the general purpose of the invention may be accomplished by providing apparatus to make a correction for Doppler dispersion. More particularly, the general purpose of the invention is accomplished by providing processing apparatus including a single signal generator providing a replica signal and a pair of digital time compression units whose time compressed output signals are read out for correlation by correlation apparatus at various rates calculated to eliminate the adverse effects of Doppler dispersion on data signals of varying frequency. The invention further contemplates modulating a sum signal derived from the time compressed data and replica signals with the output signal of a step oscillator having an output frequency varying in steps corresponding to predetermined relative target velocities in order to compensate for the actual Doppler frequency shift introduced into the received signal. The invention additionally contemplates that the sonar return signal be down modulated prior to dispersion correction to a frequency range suitable for sampling at a rate low enough relative to a usable read out rate in order to provide a satisfactorily high time compression ratio.

DESCRIPTION OF THE PREFERRED EMBODIMENT

Figure 1B:
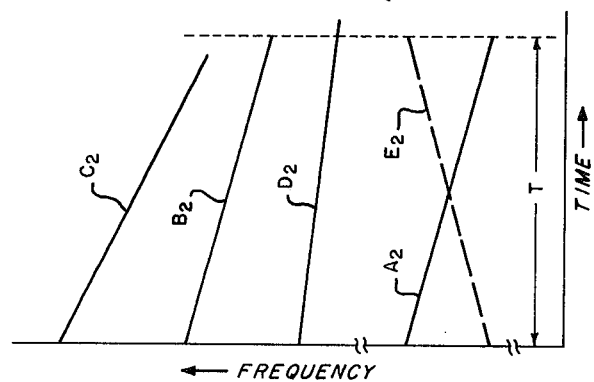
FIGS. 1a and 1b represent frequency-time characteristics of various transmitted sonar signals, the returns thereof which have Doppler frequency shifts and suitable replica signals.
Figure 1A:
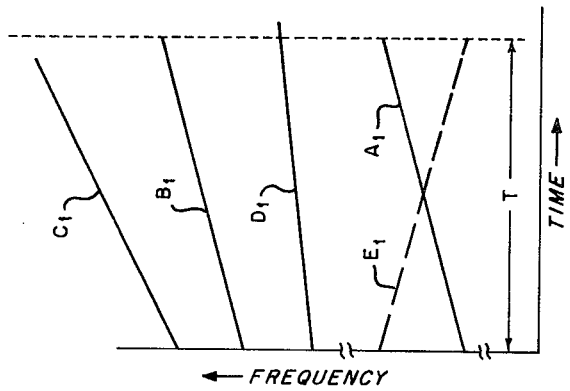

The invention may be better understood by referring to the frequency-time characteristics of FIGS. 1a and 1b wherein the characteristics $A_1$ and $A_2$ represent frequency-time characteristics of signals to be shifted upwardly in frequency for transmission and having respectively increasing and decreasing changes in frequency over a predetermined bandwidth W during a predetermined period of signal duration T. The characteristics $A_1$ and $A_2$ have center frequencies selected to provide manageable signals when compressed by a predetermined desired compression ratio. The characteristics $B_1$ and $B_2$ represent those of the sonar signals to be transmitted in a desired frequency range and also the returns thereof from relatively stationary targets. The slopes of $A_1$, $A_2$, $B_1$, and $B_2$ are identical in magnitude, there being a constant difference frequency between $A_1$ and $B_1$ and between $A_2$ and $B_2$. The characteristics $C_1$ and $C_2$ represent the frequency-time characteristics of sonar return signals which have undergone an additional upward shift in frequency by reason of the Doppler effect during positive relative target velocity conditions, i.e., the target is approaching the signal transmitting-receiving point. Similarly, characteristics $D_1$ and $D_2$, respectively, represent the frequency-time characteristics of return data signals reflected from the target having a negative relative velocity, i.e., the target is moving away from the transmitting-receiving point. As shown in exaggeration, the Doppler effect not only causes unequal shifts in frequency as viewed at the ends of the frequency band of the signal but also causes slight compression or expansion of the duration of the sonar return signal.

Figure 2:
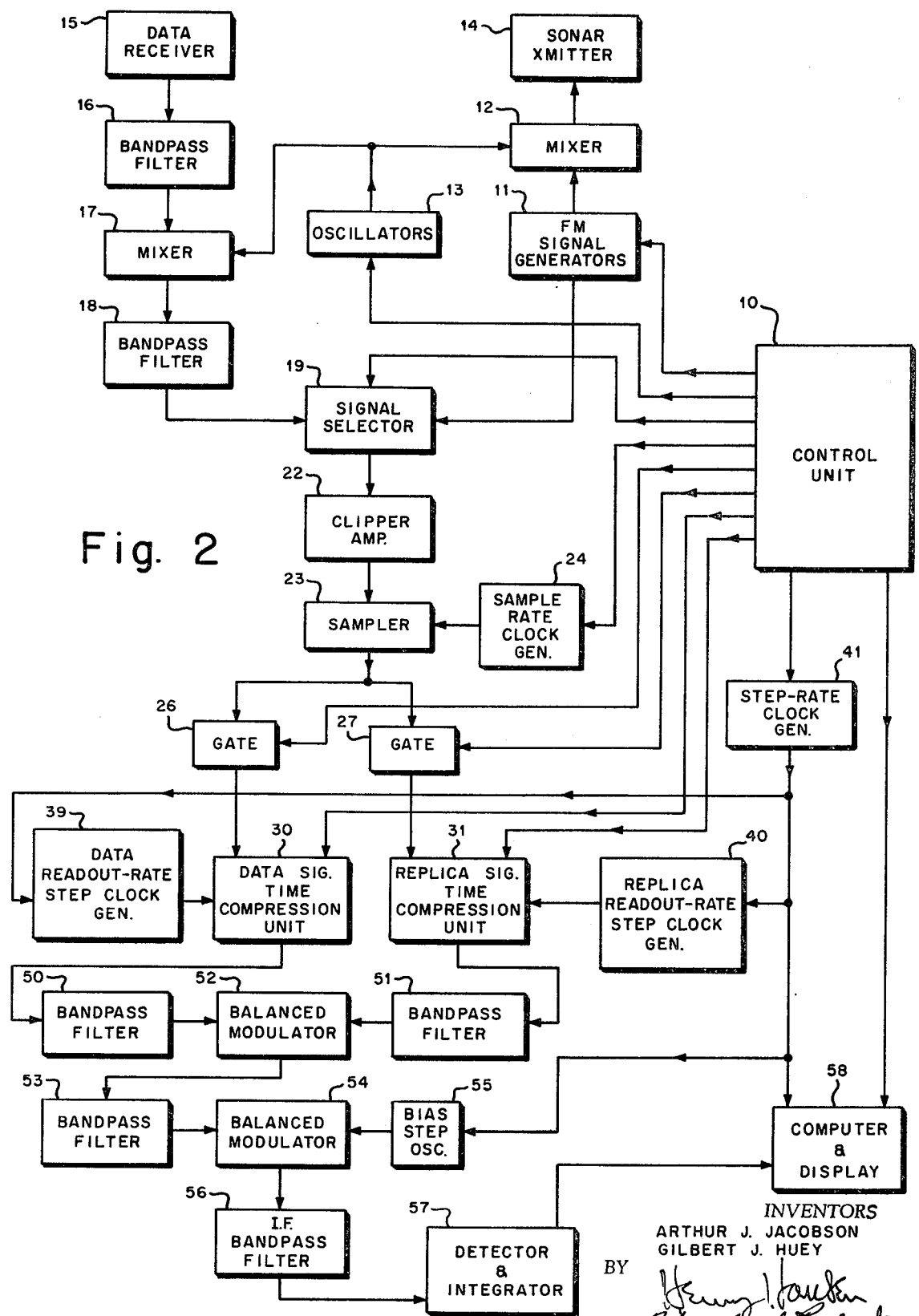
FIG. 2 represents a block diagram of signal processing apparatus according to the invention.

The characteristics $E_1$ and $E_2$ indicated by dashed lines represent the frequency-time characteristics of the replica signals to be applied to the correlation apparatus of FIG. 2 along with the respective data signals, i.e., return signals which have been down modulated by the above-mentioned constant difference frequency. The slopes of $E_1$ and $E_2$ are equal in magnitude but opposite in sign to those of $A_1$ and $A_2$, and the center frequencies and bandwidths W of $E_1$ and $A_1$ or of $E_2$ and $A_2$ are the same.

The Doppler-shifted frequencies $f_D$ at the lower end of the frequency band of the return signals, may be defined as:

$$f_D = (1 + 2v/c)(f_c - W/2)$$

(Equation 2)

wherein $f_c$ is the center frequency of the transmitted band
and wherein the term $v^2/c^2$ is disregarded because of its relative insignificance.

The Doppler frequencies $f_D$ at the upper ends of the received bands may be defined as:

$$f_D = (1 + 2v/c)(f_c + W/2)$$

(Equation 3)

From equations 2 and 3, it can be shown that the Doppler dispersion $\Delta f$, which is representative of the change in frequency slope across the bandwidth and which may be defined by the difference between the doppler shift at the upper and that at the lower ends of the received band may be expressed by:

$$\Delta f = W(2v/c)$$

(Equation 4)

Thus, the Doppler dispersion, $\Delta f$, is independent of the center frequency $f_c$.

The effect of time compression or expansion must also be taken into account particularly in the case of signals characterized by linear frequency modulation. Since one criteria for processing the return signal is that the dispersion $\Delta f$ must be less than the effective post-correlation bandwidth, which, in turn, is equivalent to the inverse of the duration T of the signal, the bandwidth-time duration product WT must be less than the Doppler factor $c/2v$.

In general, the apparatus of FIG. 2 functions to correlate the down modulated sonar return signal, hereinafter referred to as the data signal, with the replica signal. The adverse effects of Doppler dispersion are eliminated, in effect, by readjusting the magnitude of the slope of one of the data signal frequency-time characteristics or the replica signal frequency-time characteristics to approximate that of the other by relatively varying time compression ratios of the replica signal and the data signal in a series of steps each calculated to achieve a common slope magnitude for the corresponding predetermined relative target velocity in a predetermined range. Thereafter, the apparatus functions, in effect, to correct for the center frequency shift of the sonar return signal attributable to the Doppler effect for the corresponding predetermined relative target velocity to provide signals indicative of points on the correlation functions in the range-Doppler plane for each of the predetermined relative velocities. Of course, the output signal of maximum amplitude exceeding a threshold detection level and indicative of a point on a particular correlation function may be associated with the target range and the corresponding relative velocity and may be displayed accordingly.

Referring now to the apparatus of FIG. 2, at some time, as when it is desired that a sonar signal be transmitted, a control unit 10 provides a signal to a matched pair of FM signal generators 11 causing them to provide frequency modulated signals having frequency-time characteristics such as $A_1$ and $E_1$ or $A_2$ and $E_2$ which have slopes equal in magnitude and opposite in sign. The generators 11 may alternatively be of a type including a single frequency modulated signal generator and apparatus for storing the signal supplied and reading it out in inverse order. The signal having a characteristic such as $A_1$ is fed to a mixer 12 which, in turn, receives the single frequency output signal of one of the oscillators 13 controlled by the unit 10 and provides its sum output signal having the characteristic such as $B_1$ and having an upwardly shifted center frequency in a desired range to a conventional sonar signal transmitter 14. The apparatus also includes a data receiver 15 which is arranged to receive the echoed sonar return signal directly or via a communication link as desired. The output signal of the receiver 15 is applied through a noise eliminating bandpass filter 16 to a mixer 17 which, in turn, is connected to receive the output signal of the same one of the oscillators 13 for translating the received signal downwardly in frequency. The output signal of the mixer 17 is applied through a bandpass filter 18 to a signal selector 19 and comprises the data signal whose frequency band is in a range enabling sampling at a sufficiently low rate to permit processing or compressed signals having frequencies of the magnitude achieved by multiplying the down shifted data signal frequencies by a desired compression ratio. The signal selector is also connected to receive a replica signal from the generators 11 whose frequency-time characteristic such as $E_1$ has a slope equal in magnitude and opposite in sign to that of the signal such as $A_1$ supplied to the mixer 12.

The signal selector 19 is controlled by the unit 10 and normally applies the data signal to a clipper amplifier 22 except during the period it is desired to apply the replica signal such as $E_1$ from the generators 11 to the clipper amplifier 22 as when a sonar signal is being transmitted or alternately on a time-sharing basis. The output of the clipper amplifier 22 is fed to a sampler 23 which, in turn, supplies a corresponding output signal comprising a series of digital words at a sample rate controlled by a sample rate oscillator 24. The sample rate oscillator 24, in turn, is also controlled by the control unit 10. One suitable form for the output signal of the sampler may comprise a digital word ONE when, at the time a sample is made, the output signal of the clipper amplifier 22 is positive and a digital word ZERO when the amplifier signal is negative. A suitable relationship for the sample rate exceeds as by a factor of three, the maximum anticipated doppler shifted frequency component of the data signal being applied to the signal selector 19. For example, for a desired compression ratio on the order of 2432 and a down shifted data signal having a center frequency on the order of 800 Hz and having a bandwidth on the order of plus or minus 200 Hz, a sample rate on the order of 4,096 Hz has been found to be satisfactory.

The serial digital signal from the sampler 23 is applied through a pair of gates 26 and 27, controlled by the control unit 10, to data signal and replica signal digital time compression units 30 and 31 wherein the data and replica signals are respectively stored and read out at much greater rates than the sample rate thereby effecting time compression of the data and replica signals. Of course, the sample rate oscillator 24, the gates 26 and 27 and the signal selector 19 can be controlled or sequenced by the control unit 10 in a conventional manner so that appropriate samples of both the data signal and the replica signal are alternately supplied at the same sample rate to their respective compression units 30 and 31 even though the transmission time of a sonar signal of a selected duration and the time of reception of the return signal may overlap. Additionally, it is contemplated that once a replica signal has been provided by the generators 11 and converted to digital form and stored in the unit 31 successive sampled replicas of each succeeding transmitted signal need not necessarily be sampled and stored.

Figure 3:
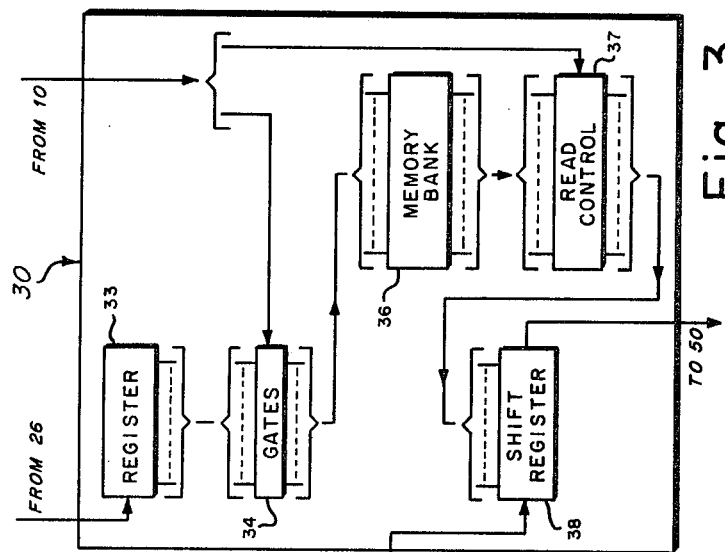
FIG. 3 represents a block diagram of a time compression unit included in the apparatus of FIG. 2.

The unit 30 generally compresses the input signal thereto in the same manner as the electronic time compression device disclosed in U.S. Pat. No. 3,295,107 issued Dec. 27, 1966, to R. E. Stalcup. The compression ratio CR for a unit is defined as the ratio of the input signal readout rate to the input signal sample rate. The data signal time compression unit 30, disclosed in more detail in FIG. 3, generally includes a register 33 into which are loaded a number of succeeding bits of information from the sampler 23. When the register 33 has been filled, its contents are applied in parallel by gates 34 controlled by the unit 10 for loading into a memory bank 36. The memory bank 36 has at least a sufficient capacity to store a number of bits collectively representing in real time the duration T, such as one second, of the transmitted sonar signal. As the newest bits of information are loaded into the memory bank 36, a corresponding number of the oldest bits are discarded. The unit 30 further includes read control circuitry 37 which successively fills a readout shift register 38 with copies of the contents of succeeding groups of storage elements in the memory bank 36, and thereby enables reading out the entire contents of the memory bank 36 in order. The shift register 38 responds to clock pulses applied thereto from a data readout-rate step clock generator 39 to shift out its contents in series of digital signals collectively indicative of the signal applied to the signal selector 19 as compressed in time.

Referring again to FIG. 2, the replica signal time compression unit 31 is controlled by the unit 10 and similarly receives and stores in its memory bank the replica signal which has been sampled at the same sample rate as the data signal under the control of the oscillator 24. The unit 31 is read out at a rate controlled by the replica read-out rate step clock generator 40. The apparatus in this manner provides time compressed data and replica signals which, in effect, are compared by correlation to ascertain the degree of similarity thereof.

As indicated above by equations 2 and 3, each frequency component of the return signal will have undergone a shift in frequency in accordance with the Doppler effect which shift is a function of the transmitted component frequency and the relative target velocity. The effect of time compressing the data and replica signals can be visualized as mulitplying each frequency component of each signal by the time compression ratio effected by the respective unit 30 or 31. The compression ratio $CR_R$ of the replica signal unit is made different from the compression ratio $CR_D$ of the data signal unit in accordance with the following equation:

$$CR_R = (1 + 2v/c) CR_D$$

(Equation 5)

Thus, by varying the compression ratio of the replica unit 31 in a series of steps in accordance with equation (5) each corresponding to a particular relative target velocity $v$ in a desired range, one may effectively adjust the magnitude of the slope of the frequency-time characteristic of the replica signal to equal that of the data signal and thereby correct for Doppler dispersion.

The velocity difference between velocities corresponding to successive compression ratio steps in dependent upon the desired degree of resolution of the apparatus. For example, it has been found that establishing compression ratios corresponding to steps of four knots in relative target velocity will enable the provision of a possibly detectable point on at least one of the correlation functions associated with respective four-knot steps for all relative target velocities in the design range The use of steps in excess of four knots has been found to cause unacceptably low correlation function peak magnitudes achieved under relative target velocity conditions intermediate the designed velocity steps.

While equation (5) holds true for both positive and negative relative target velocities, it is desirable that the compression ratio for either unit 30 or 31 never drop below a predetermined minimum. Since for negative target velocities in accordance with equation (5) $CR_R$ will be less than $CR_D$, appropriate values for the compression ratio $CR_D$ of the data signal in the case of negative relative target velocities in terms of the minimum desired replica compression ratio $CR_R$ may be established in accordance with the following relationship:

$$CR_D = CR_R/(1 + 2v/c)$$

(Equation 6)

In accordance with either equations (5) or (6), the compression ratios of the units 30 and 31 are equal where the relative target velocity is zero.

Since the sample rates of the input signals to both units 30 and 31 are the same, the resepctive readout clock frequencies of the units 30 and 31 for each step corresponding to a given velocity v are related in the same manner as are the respective compression ratios of equations (5) and (6). Accordingly, the data and replica readout-rate step clock generators 39 and 40 are each mechanized to provide for each step corresponding to a particular predetermined relative target velocity v a sufficient number of clock pulses to cause the entire contents of their respective memory banks to be read out at the appropriate frequency. To synchronize the operation of the clock generators 39 and 40 a step-rate oscillator 41 controlled by the unit 10 provides a series of pulses each causing the generators 39 and 40 to provide their output signals having the respective appropriate frequencies for each corresponding relative velocity step. In this manner, the data signal which has been sampled and stored in the unit 30 may be correlated with the replica signal as the relative slopes of the frequency-time characteristics of the data and replica signals are relatively adjusted in a series of steps each corresponding to a predetermined relative target velocity in a desired range. New information which is being stored in the register 33 of the unit 30 can be entered into the memory bank 36 after the series of velocity steps in a correlation cycle has been completed and before the next correlation cycle begins. Some degree of similarity between the signals should be achieved during at least one of the steps in some correlation cycle. A maximum similarity indication, of course, pinpoints the time of the return of the sonar signal echo.

Figure 4:
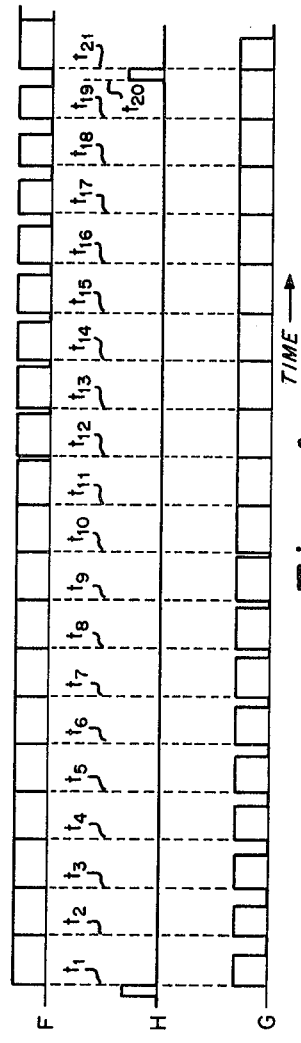
FIG. 4 represents a time diagram of the wave form envelopes of the frequency stepped output signals of step clock generators associated with respective time compression units of FIG. 2.

FIG. 4 illustrates suitable envelopes F and G of the series of clock pulses provided by the generators 39 and 40 for a compression cycle including 19 steps. At time $t_1$ the step-rate clock generator 41 causes both the generators 39 and 40 to begin emitting clock pulses at the appropriate frequencies for the step corresponding to the largest positive relative target velocity in the designed range. Since the readout frequency of the unit 31 is greater than the readout frequency of the unit 30 in accordance with the relationship derived from equation (5), the entire contents of the memory bank of the unit 31 will be read out before the contents of that of the data unit 30. Thereafter, at time $t_2$ when the contents of the memory bank 36 of the data unit 30 have been read out, the step-rate clock generator 41 causes the block generators 39 and 40 to begin emitting the required number of clock pulses at the appropriate frequencies corresponding to the next smaller relative target velocity. At time $t_{10}$, for the step corresponding to a relative target velocity of zero, the frequencies as the clock provided by the generators 39 and 40 are the same. Therefore, the clock pulse envelope for each generator 39 and 40 has the same duration. At time $t_{19}$ for the step corresponding to the greatest negative relative target velocity in the designed range, the contents of the memory bank 36 of the data unit 30 can be read out by the clock pulses provided by the generator 39 in a lesser amount of time than is required to read out the memory bank contents of the replica unit 31. The control unit 10, therefore, provides at time $t_{20}$ a data read-in signal H to the gates 34 in the unit 30 so that the latest occurring information in the data signal which is being stored in register 33 can be entered into the memory bank 36 and the oldest information therein discarded. Thereafter, at time $t_{21}$ when the memory bank contents of unit 31 have been read out, a new correlation cycle begins.

The sample rate, the minimum desired compression ratio, the number of words of information to be loaded in a correlation cycle, and the number of correlation cycles per second are all interrelated. For example, the product of the sample rate, e.g., 4096, and the minimum desired compression ratio, e.g., 2432, indicates the minimum number of bits of information read out per second, i.e., the read out frequency for the step corresponding to a relative target velocity of zero. The minimum number of bits in a signal of interest to be read out in a second divided by the product of the number of desired steps in a correlation cycle, e.g., 19, the sample rate, and the signal duration, e.g., 1 second, equals the maximum number of correlation cycles which should be completed in a second, i.e., the correlation cycle rate such as 128. The quotient of the sample rate and the correlation cycle rate equals the number of bits, e.g., 32, which should be loaded in a given correlation cycle so that no data signal information is lost.

The compressed output signals of the units 30 and 31 are fed through respective bandpass filters 50 and 51 and are applied to a balanced modulator 52 for providing an output signal whose instantaneous frequency is the sum of the instantaneous frequencies of the filtered data and replica signals. The bandwidths and center frequencies of the bandpass filters 50 and 51 are selected to convert the digital pulse train from the units 30 and 31 into an analog signal. The sum output signal of the modulator 52 is fed to a bandpass filter 53. The bandwidth characteristics of the filters 50, 51 and 53 are similar, while the center frequency of the filter 53 is substantially twice that of the filters 50 and 51.

In essence, the balanced modulator 52 and filter 53 function as a beat frequency correlation device which can produce a constant frequency signal if the slopes of the frequency-time characteristics of the output signals of the units 30 and 31 have equal magnitudes because the slopes have opposite signs. The constant frequency signal will be stable within about one cycle per second if the adverse Doppler dispersion effect is substantially eliminated, as shown above, by adjusting the relative compression ratios of the compression units 30 and 31.

Since the Doppler effect causes a gross echo frequency shift in the return signal which is a function of the frequencies of the transmitted sonar signal and the relative target velocity, the output signal supplied by the modulator 52 will be shifted in frequency if there is a relative target velocity other than zero. In order to permit the use of a single system output filter, the output signal from the modulator 52 is heterodyned with that from an oscillator output signal having a frequency which varies in steps synchronized in time with the stepping of the generators 39 and 40 for each of the various predetermined relative target velocities during a correlation cycle.

Accordingly, the output signal of the modulator 52 is fed through the filter 53 to a balanced modulator 54 along with the output of a bias step oscillator 55 which responds to the step rate clock generator 41 to provide an output signal whose frequency varies in steps. The difference output signal of the balanced modulator 54 is applied through a narrow bandwidth bandpass filter 56 and is applied to a detector and integrator unit 57 which, in turn, provides for each step a signal which is, if detectable, indicative of a point on the correlation function for that step. The output signal of the detector and integrator unit 57 is applied to a computer and display unit 58 which is synchronized with the control unit 10 and the step clock generator 41. The computer and display unit 58 is mechanized to associate each correlation point indicating signal above a minimum threshold level from the unit 57 with a particular range and with a particular relative velocity and to display them accordingly. Thereby, the range and relative velocity of the target may be tracked.

In general, it is desired that the output signal of the balanced modulator 54 have a constant predetermined intermediate frequency. Therefore, at the time of maximum correlation the frequency of the output signal of the oscillator 55, $f_{osc}$, should equal the desired intermediate frequency IF plus the frequency of the output signal of the modulator heretofore indicated to be equal to the sum of the filtered output frequencies of the compression units 30 and 31. Since the adverse effects of Doppler dispersion have been corrected or alleviated by the stepped adjustment in the relative compression ratios of the units 30 and 31, the center frequencies of the various signals may be used to ascertain the necessary correction for the Doppler shift. The center frequency $f_{cd}$ of the down-shifted data signal includes the gross Doppler shift introduced on the center frequency $f_{cx}$ of the transmitted sonar signal. Additionally, as indicated above in equation (5), the correction for Doppler dispersion at positive relative target velocities introduces an upward frequency shift in the replica signal frequency which is equivalent to the product of the compression ratio $CR_R$, the Doppler correction factor $2v/c$, and the center frequency $f_{cr}$ of the replica signal. For positive relative target velocities where $CR_D$ is the minimum, the following relationship therefore applies:

$f_{osc}$ = IF + $f_{cd}$ ($CR_D$) + $f_{cd}$ ($CR_D$)(1 + $2v/c$) + $2v/c$ ($f_{cx}$)($CR_D$)   (Equation 7)
= IF + $CR_D$ [$2f_{cd}$ + $2v/c$ ($f_{cd}$ + $f_{cx}$)]   (Equation 8)

For negative relative target velocities where $CR_R$ is the minimum, the following relationship applies:

$f_{osc}$ = IF + $f_{cr}$ ($CR_R/1+2v/c$) + $f_{cr}$ ($CR_R$) + $2v/c$ ($f_{cx}$) ($CR_R/1+2v/c$)   (Equation 9)
= IF + ($CR_R/1+2v/c$) [$2f_{cr}$ + $2v/c$ ($f_{cr} + f_{cx}$)]   (Equation 10)

Equations (8) and (10) may be used to ascertain the appropriate frequency of the output signal of the bias step oscillator 55 for each step corresponding to a predetermined relative target velocity.

Since the output signal of the balanced modulator 54 should be a signal of constant frequency in those instances where the data signal is effectively matched with the replica signal during at least one of the steps wherein the effects of Doppler dispersion and of gross Doppler frequency shift are corrected, it is desirable that the filter 56 be a narrow band filter having a center frequency equal to the intermediate frequency IF. The bandwidth of the filter 56 depends upon the desired degree of resoltuion. For example, it has been discovered that a bandwidth of twenty times the minimum compression ratio utilized in the units 30 and 31 for a relative target velocity of zero permits analysis over a twenty cycle per second bandwidth in real time. It is contemplated, however, that filters having a much narrower real time bandwidth such as about one cycle per second could be used which filters would have an actual bandwidth equal to the minimum desired compression ratio. Additionally, the integrator portion of the detector and integrator unit 57 should have an integration time set approximately equal to the ratio of the duration of the sonar signal being processed to the compression ratio for zero relative target velocity.

The invention therefore provides signal processing apparatus of great flexibility which is able to detect and sort sonar return signals into appropriate range groupings and appropriate relative target velocity groupings. The great flexibility of the apparatus is demonstrated in that the unit 10 need only cause a shift to the output signal of another of the oscillators 13 to provide multichannel operation by the apparatus. In this case, each of the channels has the same rate of change of frequency with time. Additionally, the apparatus is not limited solely to frequency modulated signals having linearly varying frequency-time characteristics. The apparatus disclosed may be used to process sonar signals characterized by more complex forms of time varying frequency modulation. The apparatus of the invention requires that only one replica signal need be produced which signal for the bandpass correlation type apparatus has a frequency rate of change opposite in sign to that of the sonar signal to be transmitted. The apparatus avoids all the problems introduced by a design approach requiring a separate replica signal generator each for producing a respective signal having introduced thereinto the frequency shifts imposed by Doppler effects at each corresponding relative velocity. While the invention has been described with reference to a specific embodiment suitable for sonar applications, the principles of the invention are equally applicable to radar apparatus and the like.

What is claimed is:

1. Apparatus for processing the return signal of a frequency modulated signal transmitted through a predetermined medium comprising:

means for providing a data signal indicative of the frequency modulated return signal;

means for providing a frequency modulated replica signal; and dispersion correction means connected to receive said replica and data signals for adjusting relatively the frequency-time characteristics of said data and replica signals in a manner calculated to compensate for Doppler dispersion and providing dispersion corrected data and replica signals for correlation.

2. Apparatus according to claim 1 wherein said dispersion correction means includes:

data signal and replica signal time compression means connected to receive said data and replica signals for compressing said signals at respective compression ratios $CR_D$ and $CR_R$ and providing said output signals suitable for correlation in time compressed form; and control means connected to said compression means for adjusting relatively said compression ratios $CR_D$ and $CR_R$ in a manner calculated to correct for Doppler dispersion.

3. Apparatus according to claim 2 wherein:

said time compression means includes sampling means for sampling said data and replica signals at the same sample rate and providing sampled data and replica signals in digital form indicative of said data and replica signals, and a pair of digital time compression units connected for receiving respective ones of said sampled data and replica signals and each being responsive to a readout-rate clock signal for providing respective said time compressed output signals; and said control means includes a pair of clock generators connected to respective said compression units for providing said readout-rate clock signals of relative frequencies causing corresponding relatively adjusted compression ratios $CR_D$ and $CR_R$ for said data and replica signals for correcting for Doppler dispersion.

4. Apparatus according to claim 2 wherein said control means includes means adjusting said compression ratios $CR_D$ and $CR_R$ relatively to one another in a succession of steps each calculated to correct for Doppler dispersion introduced for a respective predetermined relative target velocity v in a predetermined range of velocities.

5. Apparatus according to claim 4 wherein said control means causes said compression ratio of said replica signal, $CR_R$, to be related to that of said data signal, $CR_D$, in accordance with the following equation:

$$CR_R = (1 + 2v/c) C_D$$

wherein c equals the propagation velocity of the transmitted signal through the predetermined medium.

6. Apparatus according to claim 5 wherein said control means causes said compression ratio $CR_D$ to be related to said ratio $CR_R$ for a series of predetermined negative relative target velocities in accordance with the following equation:

$$CR_D = CR_R/(1 + 2v/c).$$

7. Apparatus according to claim 4 wherein said control means causes said compression ratio of at least one of said data and replica signals to equal a predetermined minimum and causes said compression ratio of the other said signal to be adjusted in a series of steps corresponding to a succession of predetermined relative target velocities.

8. Apparatus according to claim 4 wherein:

said control means decreases said compression ratio $CR_D$ of said data signal in a series of steps from a respective predetermined maximum value to a predetermined minimum value while said compression ratio $CR_R$ of said replica signal has said predetermined minimum value for a series of successively decreased positive relative target velocities v in accordance with the relationship:

$$CR_D = (1 + 2v/c) CR_R$$

and thereafter said control means increases said compression ratio $CR_R$ from said predetermined minimum value to a respective predetermined maximum value while said ratio $CR_D$ has said predetermined minimum value for a series of successively increased negative relative velocities v in accordance with the relationship:

$$CR_R = CR_D/(1 + 2v/c)$$

wherein c equals the propagation velocity of the transmitted signal through the predetermined medium.

9. Apparatus according to claim 1 further comprising:

correlation means connected to receive said dispersion corrected data and replica signals for correlating same and providing an output signal indicative of points on at least one correlation function.

10. Apparatus according to claim 9 wherein said correlation means includes:

first modulator means connected to receive said dispersion corrected data and replica signals for providing a first modulator output signal;

first oscillator means providing an output signal whose frequency is adjusted in a series of steps for each one of a series of predetermined relative target velocities v calculated to correct at least one said step of said first modulator output signal for Doppler frequency shift;

second modulator means connected to receive said first oscillator means output signal and said first modulator output signal for providing a second modulator output signal; and filter and detector means connectd to receive said second modulator output signal for providing output signals indicative of points on correlation functions each in a resepctive range-Doppler plane at a respective said predetermined relative target velocity.

11. Apparatus according to claim 10 wherein said dispersion correction means includes:

data signal and replica signal time compression means connected to receive said data and replica signals for compressing said signals at respective compression ratios $CR_D$ and $CR_R$ and providing said output signals suitable for correlation in time compressed form; and control means connected to said compression means for adjusting relatively said compression ratios $CR_D$ and $CR_R$ in a succession of steps each calculated to correct for Doppler dispersion introduced for respective said predetermined relative target velocities v in synchronization with corresponding said steps of output signal frequency adjustment of said first oscillator means.

12. Apparatus according to claim 11 wherein:

said time compression means includes sampling means for sampling said data and replica signals at the same sample rate and providing sampled data and replica signals in digital form indicative of said data and replica signals, and a pair of digital time compression units connected for receiving respective ones of said sampled data and replica signals and each being responsive to a readout-rate clock signal for providing respective said time compressed output signals; and said control means includes a step-rate oscillator for providing a correlation cycle step control signal for each said step and a pair of readout-rate clock generators connected to respective said compression units, said generators being responsive to said cycle step control signals for providing in said steps said readout-rate clock signals of relative frequencies causing said compression units to have corresponding relatively adjusted compression ratios $CR_D$ and $CR_R$ for said data and replica signals and said first oscillator means being connected to receive said cycle step control signals and being responsive thereto for adjusting its said output signal frequency in said steps.

13. Apparatus according to claim 12 further comprising:

signal generator means for providing a first frequency modulated signal and said frequency modulated replica signal having a frequency-time characteristic equal in magnitude and opposite in sign to that of said first signal; and first mixer means for shifting the center frequency of said first signal a predetermined degree upwardly to a transmission signal center frequency $f_{cx}$ and providing the frequency modulated signal for transmission;

said means providing said data signal including a second mixer means connected to receive a signal indicative of the frequency modulated return signal for shifting the center frequency thereof said predetermined degree downwardly and providing said data signal having a center frequency $f_{cd}$.

14. Apparatus according to claim 13 wherein:

said first modulator means provides an output signal indicative of the sum of the frequencies of said time compressed data and replica signals; and said oscillator means provides for each said step an output signal having a frequency $f_{osc}$ determined in accordance with the following relationship:

$$f_{osc} = IF + CR_D [2f_{cd} + 2v/c (f_{cd} + f_{cx})]$$

wherein IF is a predetermined intermediate frequency, $CR_D$ is the compression ratio of said data signal and c equals the propagation velocity of the transmitted signal through the predetermined medium.

15. Apparatus according to claim 14 wherein:

said second modulator means provides a difference output signal comprising said second modulator output signal;

said filter and detector means includes a narrow bandwith bandpass filter having a center frequency equal to IF; and said control means decreases said compression ratio $CR_D$ of said data signal in a series of steps from a respective predetermined maximum value to a predetermined minimum value while said compression ratio $CR_R$ of said replica signal has said predetermined minimum value for a series of successively decreased positive relative target velocities v in accordance with the relationship:

$$CR_D = (1 + 2v/c) CR_R$$

and thereafter said control means increases said compression ratio $CR_R$ from said predetermined minimum value to a respective predetermined maximum value while said ratio $CR_D$ has said predetermined minimum value for a series of successively increased negative relative velocities v in accordance with the relationship:

$$CR_R = CR_D/(1 + 2v/c)$$

wherein c equals the propagation velocity of the transmitted signal through the predetermined medium.

16. Apparatus according to claim 15 wherein:

said readout-rate clock generators and said step-rate oscillator provide their respective said output signals in steps corresponding to velocity steps on the order of at most four knots.

17. Apparatus according to claim 9 further comprising:

said means providing said frequency modulated replica signal including means for providing a said replica signal having a varying frequency time characteristic such that the sum of said replica signal and the transmitted signal of varying frequency time characteristic yields a signal of constant frequency.

* * * * *